United States Patent
Saiki et al.

(10) Patent No.: US 7,310,936 B2
(45) Date of Patent: Dec. 25, 2007

(54) CABLE PROTECTION AND GUIDE DEVICE

(75) Inventors: Kenichi Saiki, Osaka (JP); Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/437,232

(22) Filed: May 19, 2006

(65) Prior Publication Data
US 2007/0017199 A1 Jan. 25, 2007

(30) Foreign Application Priority Data
Jul. 1, 2005 (JP) .............................. 2005-194211

(51) Int. Cl.
*F16G 13/16* (2006.01)
(52) U.S. Cl. ........................................ 59/78.1; 248/49
(58) Field of Classification Search ................ 59/78.1; 248/49, 51
See application file for complete search history.

(56) References Cited

U.S. PATENT DOCUMENTS 5,020,313 A * 6/1991 Moritz et al. ................ 59/78.1
5,860,274 A * 1/1999 Saleh et al. .................. 59/78.1
6,156,974 A * 12/2000 Blase .......................... 59/78.1
6,173,560 B1 * 1/2001 Weber ......................... 59/78.1
6,425,238 B1 * 7/2002 Blase .......................... 59/78.1
6,615,573 B2 * 9/2003 Blase .......................... 59/78.1

FOREIGN PATENT DOCUMENTS

JP          03-096738          4/1991

* cited by examiner

*Primary Examiner*—David B Jones
(74) *Attorney, Agent, or Firm*—Woodling, Krost and Rust (57) ABSTRACT

Shoes having wear indicators are mounted on inner circumferential sides of side link plates of link frame bodies. The link frame bodies are interconnected longitudinally to form a cable protection and guide device. During operation, the device folds back upon itself such that the shoes of some of the link frame bodies slidingly engage the shoes of other link frame bodies. The indicator may be a groove, may employ a two color resin, may be a metal plate and may be positioned and sized to provide caution and limit indications as desired.

4 Claims, 8 Drawing Sheets

CABLE PROTECTION AND GUIDE DEVICE

Priority is claimed to Japanese Patent Application 2005-194211 filed Jul. 1, 2005.

TECHNICAL FIELD

The present invention relates to a cable or the like protection and guide device which safely and reliably protects and guides flexible cables. The cable may be an electric cable which connects a movable portion and a stationary portion to each other in an industrial machine. The cable or the like protection and guide device houses and guides a cable which transmits electric signals, supply power, and/or a hose (which supplies oil pressure, air pressure and the like).

BACKGROUND TECHNOLOGY

A conventional cable or the like protection and guide device has a configuration having a number of link frame bodies each comprising a pair of is right and left spaced link plates and connecting plates. A connecting plate is bridged between outer circumferential sides of the pair of right and left spaced link plates. Another connecting plate is also bridged between inner circumferential sides of the pair of right and left spaced link plates. Each of the link frame bodies are connected to each other in the longitudinal direction of the device. The radius of curvature of the device is limited to a fixed value. Each adjacent link body is rotatable with respect to the adjacent link body and the amount of rotation is limited.

When the device is folded in the longitudinal direction of the device a first portion of the link bodies are brought into contact with a second portion of the link bodies. The inner circumferential sides of the link plates of the first portion of the link bodies engage the inner circumferential sides of the link plates of the second portion of the link bodies. The engagement of the inner circumferential sides of the link plates causes noises and wear. A cable or the like protection and guide device in which an inner circumferential side of the link plate is provided with a shoe is known to the extent shown in the related art Japanese Patent Publication No. Hei. 6-23589.

PROBLEMS TO BE SOLVED BY THE INVENTION

Figure 8:
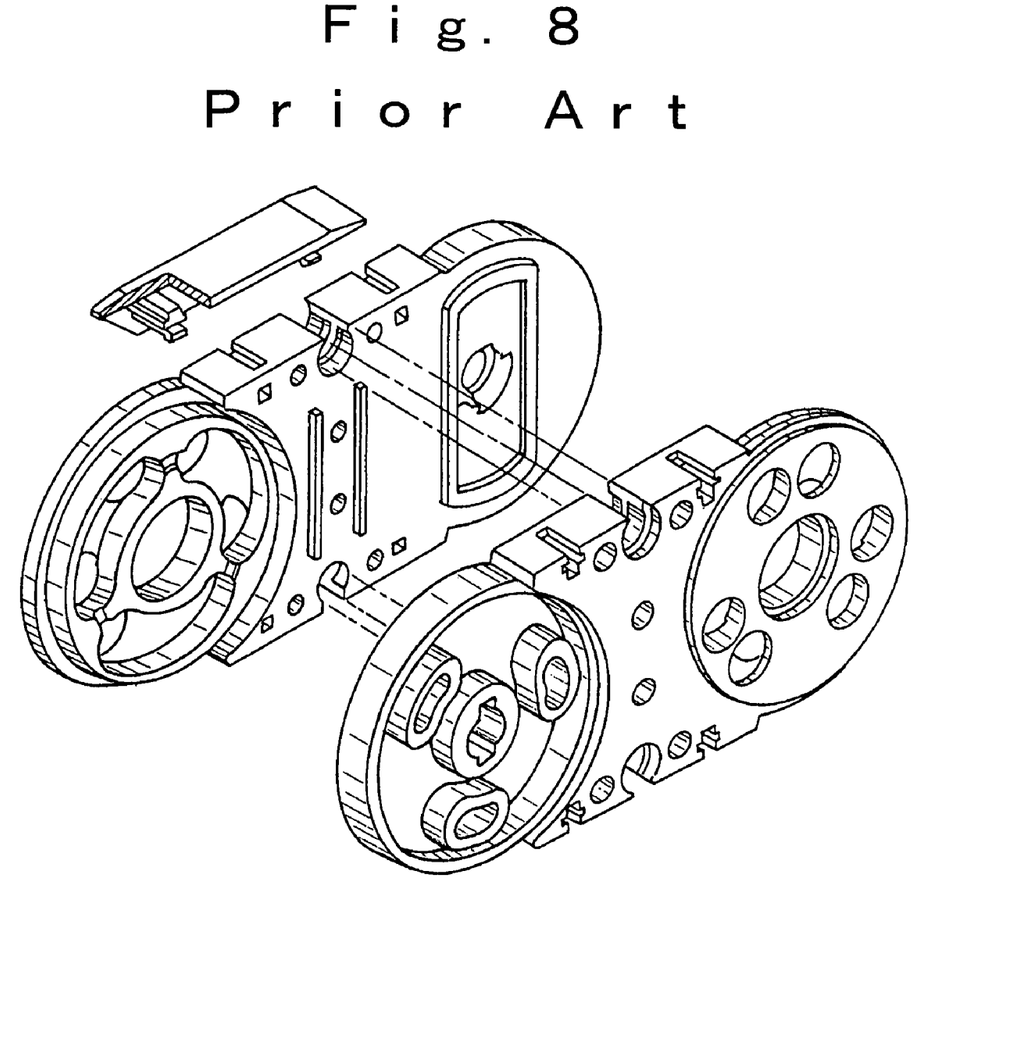
FIG. 8 is a side view showing a link frame body of a conventional cable or the like protection and guide device.

The above-mentioned related art requires special designs for mounting the shoe on a cable or the like protection and guide device as shown in FIG. 8. When shoe wear becomes advanced it cannot be detected in time for replacement which results in breakage of the device. The related art does not include a visual indication of the thickness of the shoe. Further, when the shoe wear is advanced, the measurement of the plate thickness of the shoe is impossible if the shoes are removed one by one and thus maintenance of the shoes becomes impossible. Another problem is that an instruction manual which defines required plate thickness must be provided in the related art and if it is not so provided then the required plate thickness of the shoes is not known. In the absence of procedures to determine plate thickness a skilled worker having knowledge of the required plate thickness must be used. If the worker is unskilled then maintenance of the shoes is impossible.

Accordingly, an object of the present invention is to provide a simplified mounting of a shoe on an inner circumferential side plate of a link body.

Another object of the invention is to provide shoes mounted on the inner circumferential portions of the link frame bodies which can be maintained even in the absence of an instruction manual.

Further, it is another object of the invention to provide shoes having a wear indicator which can be inspected without removing the shoe from the link plates.

MEANS FOR SOLVING THE PROBLEMS

A cable protection and guide device which includes a plurality of link frame bodies with each link frame body comprising a pair of right and left spaced link plates and connecting plates is disclosed. Each link frame body includes a pair of right and left spaced link plates and each link plate includes an outer circumferential side and inner circumferential side. One of the connecting plates bridges the outer circumferential sides of the link plates and the other of the connecting plates bridges the inner circumferential side of the link plates. The link plates are connected to adjacent link plates of adjacent link bodies in the longitudinal direction of the device. The link plates restrict the radius of curvature of each said link body with respect to the adjacent link bodies. The device is characterized in that each of the inner circumferential sides of each of the link plates includes a shoe mounted thereon. The mounting of the shoe is simplified as it easily snaps on the link plates and can easily be snapped off of the link plates for maintenance of the device. The cable protection and guide device is folded in the longitudinal direction upon itself. A first portion of the link bodies are folded upon a second portion of the link bodies. The shoes mounted on the first portion of the link plates of the link bodies slidingly engaging the shoes mounted on the second portion of the link plates of the link bodies. Each shoe includes a wear indicator.

The invention solves the above-mentioned problems in that the indicator is a groove in a side wall surface of the shoe. Further, the invention solves the above-mentioned problems in that the indicator is a first color and the remainder of the shoe is a second color. The color is generated by a two-color mold.

The invention solves the above-mentioned problems in that the indicator is a metallic plate. The metallic plate may be inserted into the mold during the molding process with the resinous material being molded around the metallic plate.

EFFECTS OF THE INVENTION

In a cable or the like protection and guide device in which a plurality of link frame bodies each including a pair of right and left spaced link plates and connecting plates which bridge the left and right plates outer circumferential sides and inner circumferential sides. The link plates are connected to each other in the longitudinal direction of the device and restrict the radius of curvature to a fixed value. Shoes are provided on the inner circumferential sides of the link plates. The shoes come into sliding contact with each other as the device is folded back onto itself. When the device is used in a flexed manner in the longitudinal direction of the device between a moving end and a fixed end. A wear limit indicator provided in each shoe may be visually and easily checked without removing the shoe.

The indicator includes a groove portion provided in a side wall surface of the shoe. The groove portion may be located near the slide contact surface of the shoe so as to create a caution point which occurs sooner rather than later in the wear of the shoe. The dimensions of the groove portion will also control the limit point based on the upper portion of the groove. In the creation of the groove there are two factors, first, the positioning of the groove and second, the size of the groove. The limit point is determined by the upper side of the groove portion which is the side farthest away from the slide contact surface of the shoe. The limit point may be defined as the point where the shoe must be replaced before damage occurs. The height of the groove determines the amount of wear allowable between the caution point and the limit point. The position of the groove determines the amount of war allowable before reaching the caution point. Inclusion of the groove allows easy visual inspection of the shoe at a glance to determine the amount of wear and to determine whether or not the shoe needs replaced.

The indicator can be manufactured from a resin having a first color and the other portions of the shoe may be manufactured from a second color. This is known as two-color molding with resins having different colors. The limit point of the wear can be determined and recognized when a different color from that of the body has appeared. Thus, the state of the shoe is easily determined at a glance. The inspection of the wear of the shoe is also easily determined.

The indicator may be a metallic plate which is molded within the shoe. If the shoe wears to a surface of the metallic plate, which is the limit point at which time replacement must occur, wear does not easily proceed after that because of the hardness of the metal. Thus, even if the check time is missed, the occurrence of such an accident that a shoe is dropped off by early progress of wear can be prevented in that the metal protects further easy destruction of the shoe. Also, when the shoe wears to the point of the metal the sound changes because metal is now sliding on metal. Therefore, maintenance of the shoe may be performed based on the change in sound and without a visual inspection.

The invention will be described by way of examples based on the drawings.

BRIEF DESCRIPTION OF THE DRAWINGS

FIG. 3(*a*) is a perspective view showing a shoe having an indicator in a shoe.

FIG. 3(*b*) is a perspective view showing a shoe having an indicator in a shoe.

The drawings will be best understood when reference is made to the Description of the Invention and the Claims which follow hereinbelow.

EXAMPLE 1

Figure 1:
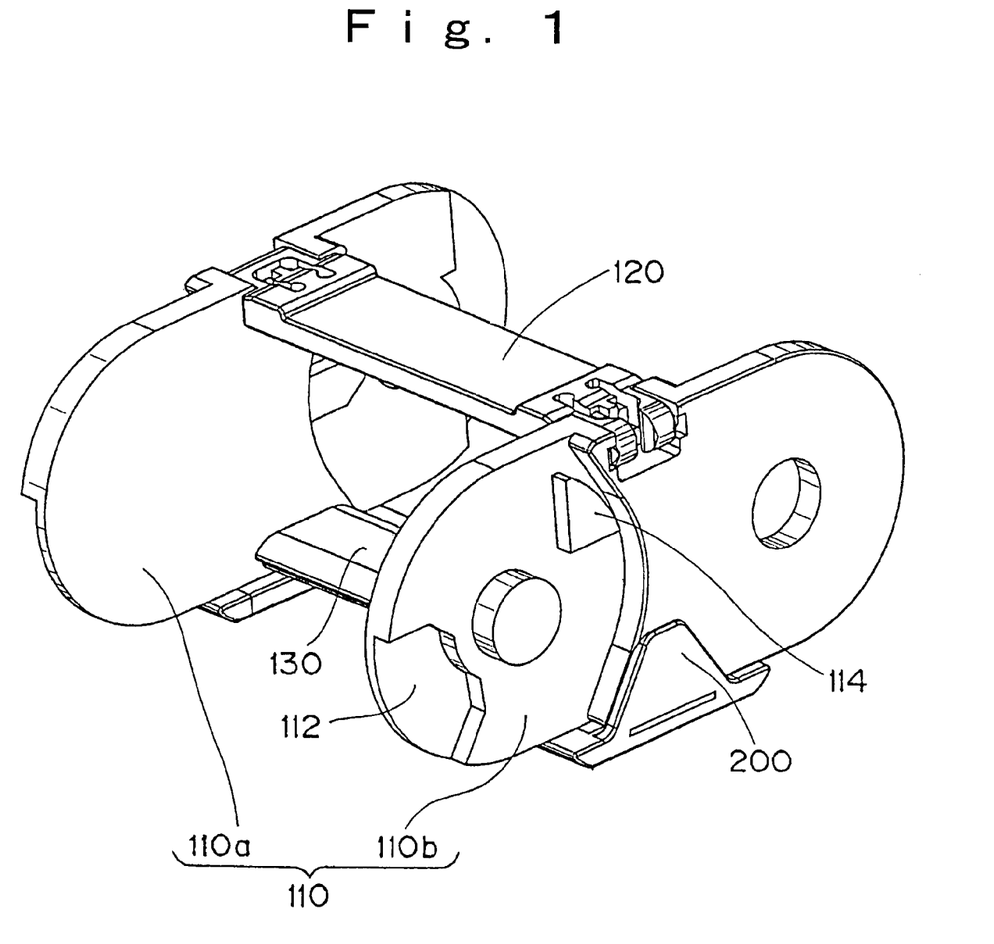
FIG. 1 is a perspective view showing a link frame body of a cable or the like protection and guide device of the present invention.
Figure 2:
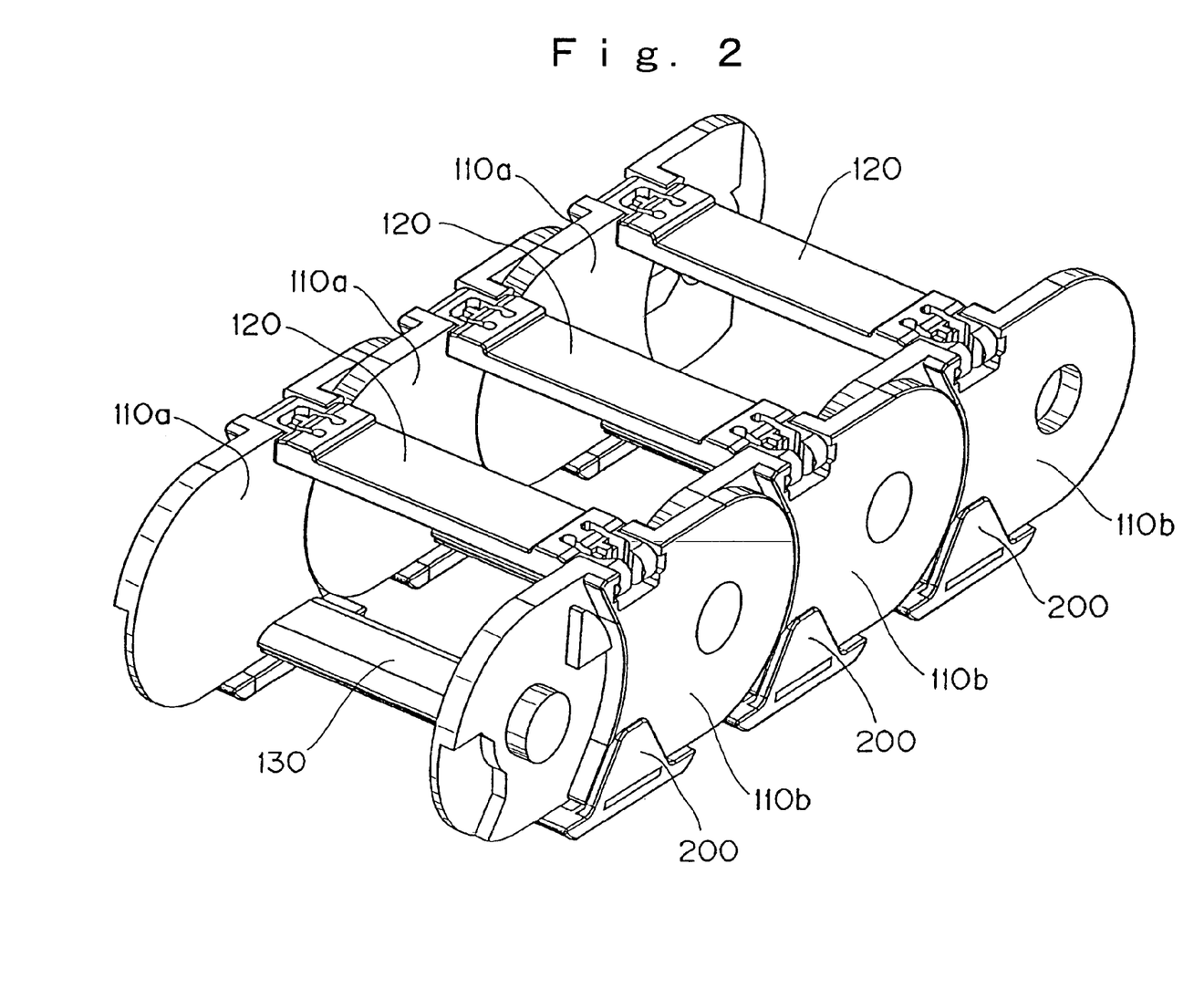
FIG. 2 is a perspective view showing three link frame bodies in the cable or the like protection and guide device of the present invention.

FIG. 1 is a perspective view showing one of the link frame bodies which form the present invention. This link frame body has a pair of right and left spaced link plates 110*a* and 110*b*, a connecting plate 120 bridged on an outer circumferential side and a connecting plate 130 bridged on an inner circumferential side of the link plate 110. Further, a cutout portion 112 and a convex portion 114 will be described. Namely, when a link frame body is connected to an adjacent link frame body, the cutout portion 112 is engaged with a convex portion 114 of the adjacent link frame body. The cutout portion 112 and the convex portion 114 restrict the radius of curvature of the device to a fixed value in the longitudinal direction of the device. FIG. 2 is a perspective view showing a state where three link frame bodies are connected to each other.

The materials forming the above-mentioned link plates 110 and the connecting plates 120, 130 are not limited. However, it is preferred that they are molded by use of a glass-fiber-reinforced polyamide resin which exhibits excellent strength properties.

Figures 3A, 3B:
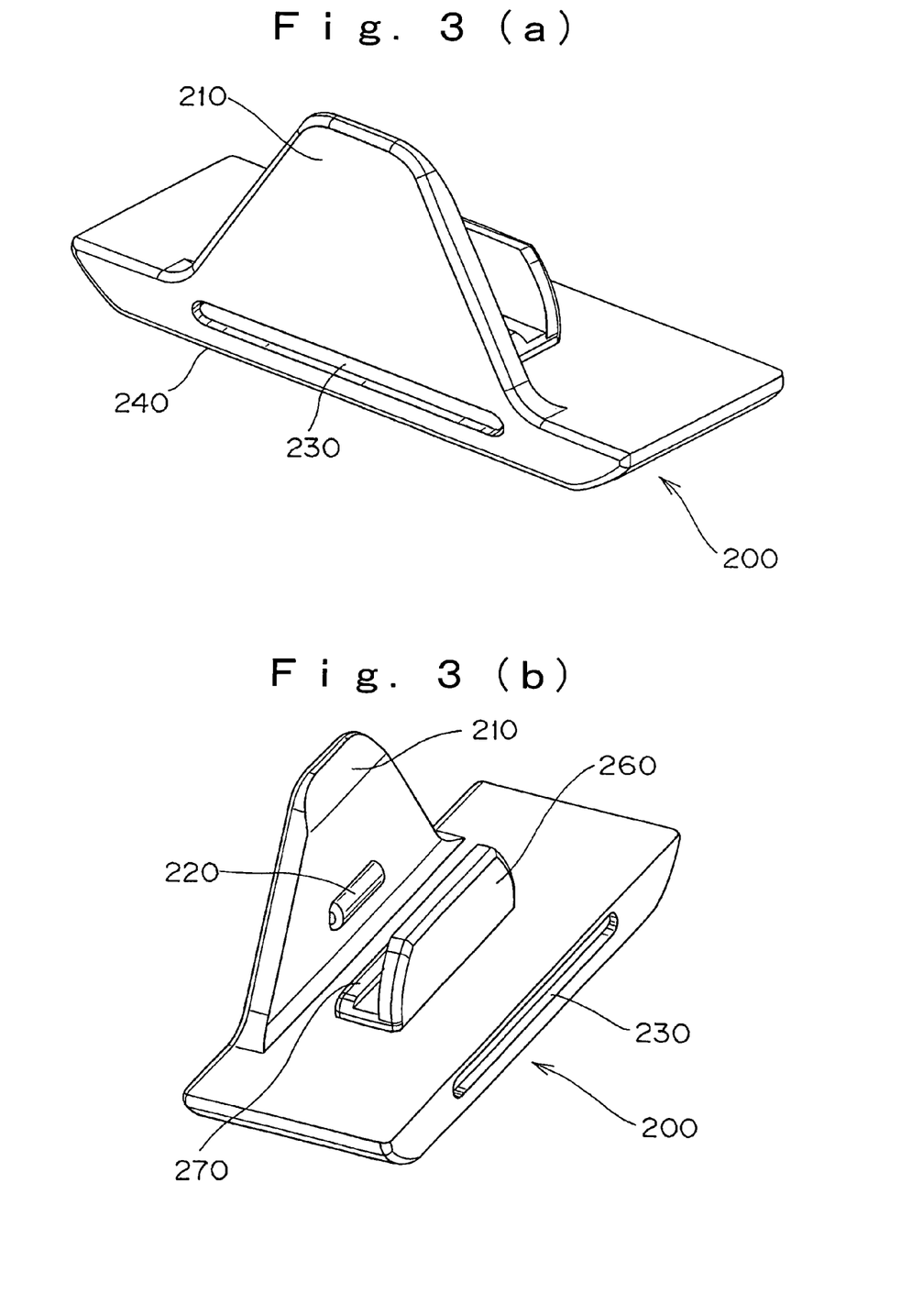

Next, the shoe 200 of a cable or the like protection and guide device according to the present invention will be described in detail. The shoes 200 are mounted on the inner circumferential sides of the link frame bodies connected as shown in FIGS. 1 and 2. FIGS. 3(A) and 3(B) are perspective views of a shoe 200 dismounted from the link frame body, the views being drawn from two directions. This shoe 200 is integrally molded by injection molding using a resin. A groove portion 230 is formed at a position relatively far away from the slide contact surface 240 of the shoe 200 by a predetermined distance. This groove portion 230 functions as an indicator. The lower side of the groove portion is relatively near the slide contact surface of the shoe which creates caution point which enables the operator or maintenance person to determine whether or not the shoe should be replaced. The upper side of the groove portion is relatively far away from the slide contact surface of the shoe which creates a limit point, a point at which the shoe must be replaced or else damage will occur. The groove enables the determination of the amount of wear of the shoe at a glance.

Figure 4:
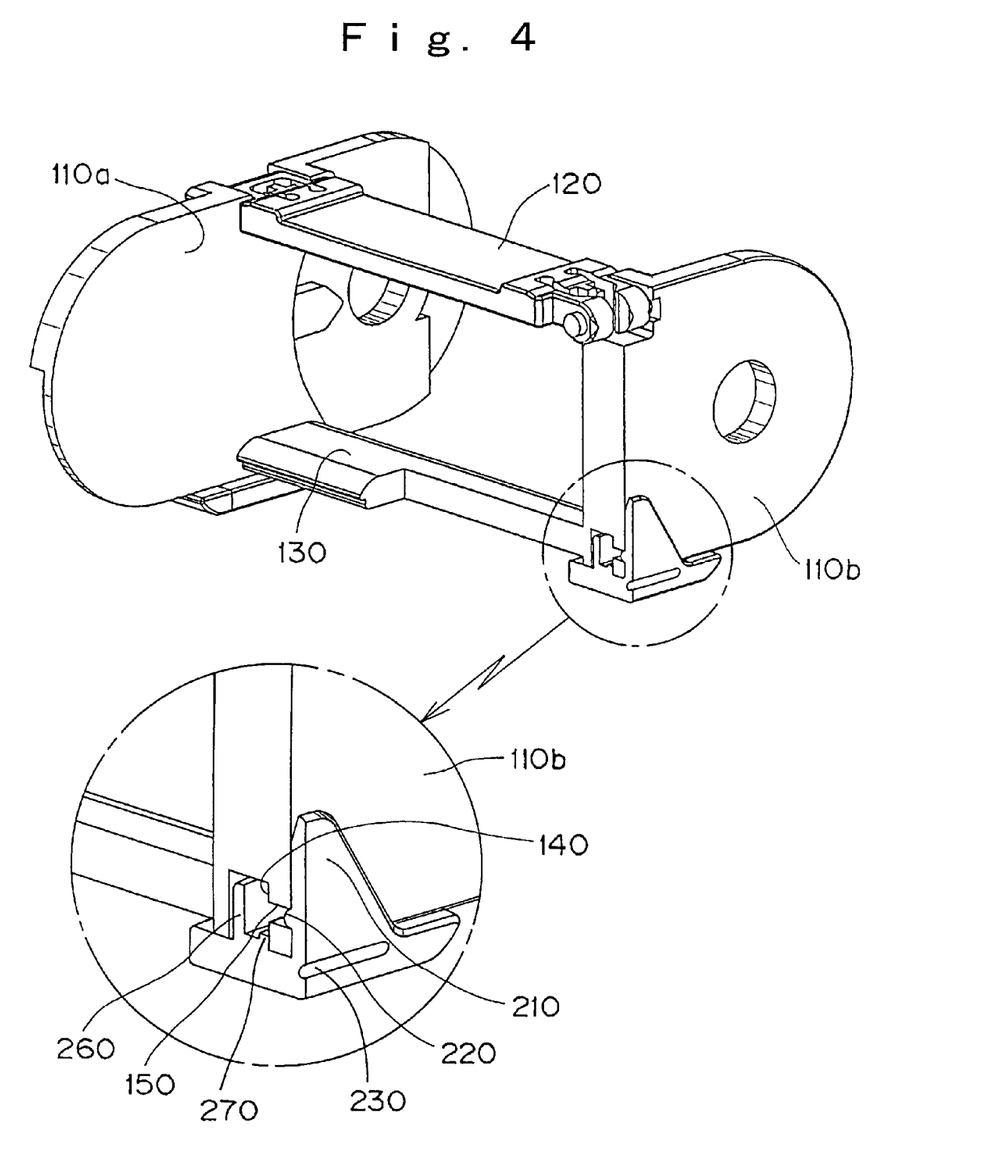
FIG. 4 is a perspective view of shoes mounted on inner circumferential sides of link plates of a link frame body with a portion thereof illustrated in an enlarged section.

Next, a mounting method of the shoe 200 onto a link frame body will be described with reference to FIG. 4. FIG. 4 is a perspective view showing a state where a part of both a near side link plate 110*b* and a connecting plate 130 bridged on an inner circumferential side is cut. An end surface of the inner circumferential side of the link plate 110*b* is provided with an insertion opening 140 into which a protrusion portion 260 and a small protrusion portion of the shoe 200 are inserted. A side surface of the link plate 110*b* is provided with a concave portion 150, which engages with a hook 220 provided on a side wall portion 210 of the shoe 200. The protrusion portion 260 and the small protrusion portion 270 are provided so that they are fitted onto inner walls of an insertion opening 140 along the inner walls. However, the protrusion portions may be combined to form one protrusion.

The side wall portion 210 of a resin is flexed during mounting of the shoe 200 so that the hook 220 is engaged with the concave portion 150 provided in the side surface of the link plate 110*b*. Further, since the hook 220 itself, which engages with the concave portion 150 provided in a side surface of the link plate 110*b*, is made of a resin and can be sufficiently deformed, the dismounting of the shoe is easy and also the assembly of the cable or the like protection and guide device is easy, and further the breakage of the shoe can be prevented.

Figure 5:
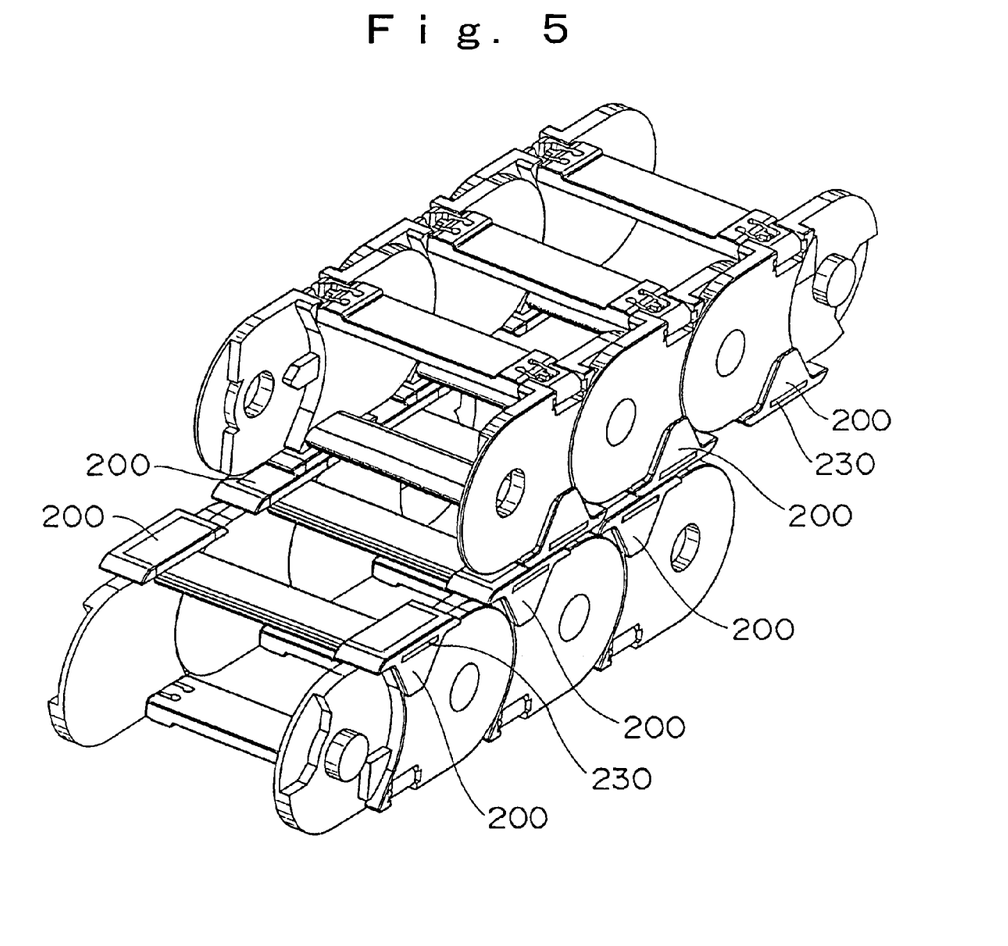
FIG. 5 is a perspective view of a portion of the cable or the like protection and guide device of the present invention being folded upon itself such that shoes of some link bodies are illustrated in sliding engagement with each other.

FIG. 5 is a perspective view showing a state where when a cable or the like protection and guide device is used in a folded manner in the longitudinal direction of the device in a moving stroke. Inner circumferential sides of some link plates and link bodies are positioned beneath the inner circumferential sides of other link plates and link bodies such that the shoes 200 are in direct contact with each other. A shoe is mounted on the inner circumferential side of every link frame body as mentioned above. Thus when a cable or the like protection and guide device is used in a folded manner in the longitudinal direction, the shoes slide on each other.

EXAMPLE 2

Figure 6:
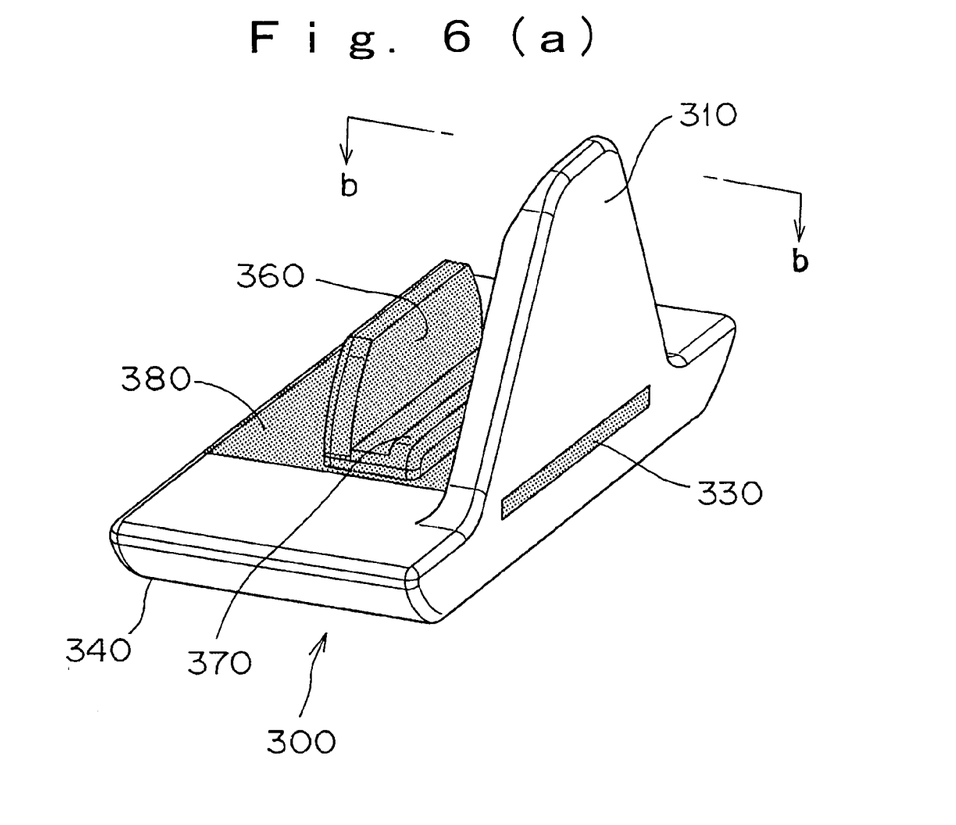
FIG. 6 is a perspective view showing another embodiment of a shoe having another example of an indicator.

Next, another embodiment of the present invention will be described based on FIG. 6. Particularly, FIG. 6(a) is a perspective view of a shoe 300 having an indicator function, and FIG. 6(b) is a cross-sectional view taken along the line b-b in FIG. 6(a). Since a mounting method of the shoe 300 on a link frame is body and the like are substantially the same as in Example 1, the explanations thereof are omitted. Shoe 300 is integrally molded by two-color molding using different color resins in the center portion 380 containing a protrusion portion 360 and a small protrusion portion 370, and a slide contact surface 340 and a side wall portion 310. Shoe 300 is molded so that an end surface of the center portion 380 is exposed from the side wall portion 310, and this end surface of the center portion 380 functions as an indicator. As is apparent from FIG. 6(b), when the slide contact surface 340 wears and the slide contact surface 340 has reached the end surface 330 of said center portion 380 is judged as a wear limit. As the resins may be two-color molded the center portion 380, which functions as the indicator, is preferably molded using a hard resin such as polyamide or polyacetal. A resin forming the slide contact surface 340 and side wall portion 310 of the shoe 300 is preferably molded using an elastomeric soft resin.

EXAMPLE 3

Figure 7:
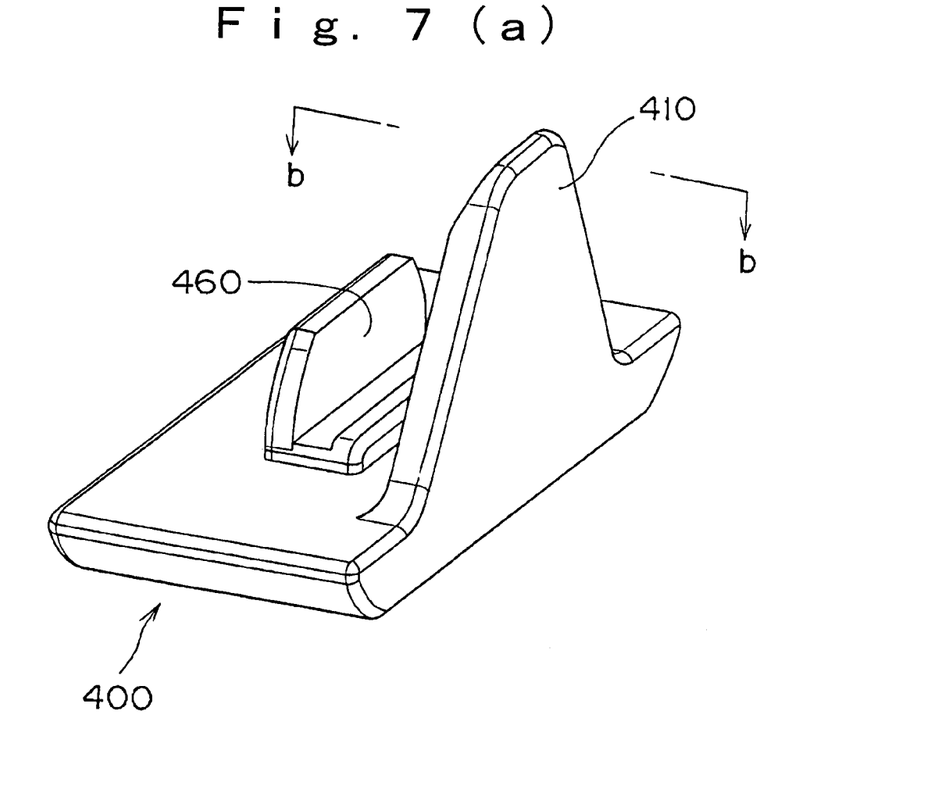
FIG. 7 is a perspective view showing still another embodiment of a shoe having another example of an indicator.

Further, another embodiment of the present invention will be described based on FIG. 7. Particularly, FIG. 7(a) is a perspective view of a shoe 400 having an indicator function, and FIG. 7(b) is a cross-sectional view taken along the line b-b in FIG. 7(a). Since a mounting method of the shoe 400 on a link frame body and the like are substantially the same as in Example 1, the explanations thereof are omitted. The entire shoe 400 is formed of a kind of resin as in Example 1, and a metallic plate 490 such as a stainless steel plate or a carbon steel plate, which functions as an indicator is buried in the resin. And the time when a slide contact surface 440 of the shoe 400 wears and the metallic plate 490 is exposed is judged to be a wear limit. Even if it is missed that wear has reached a wear limit, since the metallic plate 490 does not wear easily, such an accident that a shoe 400 is dropped off can be prevented. Further, the sound generated by sliding contact between metallic members can be readily recognized thus alerting the operator or maintenance person even if the actual shoe wear has not been visually inspected.

DESCRIPTION OF REFERENCE NUMERALS 100a, 110b . . . Link plate
112 . . . Cutout portion
114 . . . Convex portion
120, 130 . . . Connecting plate
140 . . . Insertion opening
150 . . . Concave portion
200, 300, 400 . . . Shoe
210, 310, 410 . . . Side wall portion (of shoe)
220, 320, 420 . . . Hook (of shoe)
230 . . . Groove portion (of shoe)
240, 340, 440 . . . Slide contact portion (of shoe)
260, 360, 460 . . . Protrusion portion (of shoe)
270, 370, 470 . . . Small protrusion portion (of shoe)
490 . . . Metallic portion Those skilled in the art will readily recognize that the invention has been set forth by way of Examples only and that changes may be made to the invention without departing from the spirit and scope of the invention as claimed.

The invention claimed is:

1. A cable protection and guide device, comprising a plurality of link frame bodies, each link frame body comprising a pair of right and left spaced link plates and connecting plates, said pair of right and left spaced link plates includes an outer circumferential side and an inner circumferential side, one of said connecting plates bridges said outer circumferential sides of said link plates and the other of said connecting plates bridges said inner circumferential side of said link plates, said link plates being connected to adjacent link plates of adjacent link bodies in the longitudinal direction of the device, said link plates include cutout and convex portions which restrict the rotation of each said link body with respect to the adjacent link bodies, each said inner circumferential side of each of said link plates includes a shoe mounted thereon, said shoe includes longitudinally extending first, second and third walls, each said link plate includes inner walls interengaging said first, second and third longitudinally extending walls of said shoe, said first longitudinally extending wall includes a hook protrusion thereon, each link plate includes a concave portion for receiving said hook protrusion of said first longitudinally extending wall of said shoe securing said shoe to said link plate, said cable protection and guide device being folded in the longitudinal direction upon itself, a first portion of said link bodies being folded upon a second portion of said link bodies, said shoes mounted on said first portion of said link plates of said link bodies slidingly engaging said shoes mounted on said second portion of said link plates of said link bodies, and, each of said shoes include a wear indicator.

2. A cable protection and guide device according to claim 1, characterized in that said indicator is a groove in said shoe.

3. A cable protection and guide device according to claim 1, characterized in that said shoe includes an indicator having a first color and another portion having a second color.

4. A cable and protection and guide device according to claim 1, characterized in that said indicator is a metallic plate.

* * * * *

UNITED STATES PATENT AND TRADEMARK OFFICE
CERTIFICATE OF CORRECTION

PATENT NO. : 7,310,936 B2  Page 1 of 1
APPLICATION NO. : 11/437232
DATED : December 25, 2007
INVENTOR(S) : Saiki et al.

It is certified that error appears in the above-identified patent and that said Letters Patent is hereby corrected as shown below:

Column 1, line 21, after "of" delete "is".

Column 5, line 24, after "frame" delete "is".

Signed and Sealed this

Twenty-ninth Day of April, 2008

JON W. DUDAS
*Director of the United States Patent and Trademark Office*